Patented July 4, 1950

2,514,221

UNITED STATES PATENT OFFICE 2,514,221

STABILIZATION OF RUBBERY COPOLYMERS WITH STANNOUS PHENYLCATECHOLATES

Harry E. Albert, Akron, Ohio, assignor to The Firestone Tire & Rubber Company, Akron, Ohio, a corporation of Ohio No Drawing. Original application January 10, 1948, Serial No. 1,674. Divided and this application November 2, 1949, Serial No. 125,151

6 Claims. (Cl. 260—45.75)

This invention relates to the stabilization of rubbery copolymers of a conjugated-diene monomer and a vinyl monomer with a stannous phenyl catecholate.

This application is a division of my application Serial No. 1,674 filed January 10, 1948.

The word "catechol" is used herein to refer to orthodihydroxybenzene, sometimes called pyrocatechin. The stannous compounds are called salts because it is believed they are true salts. They may be basic salts or hydrates.

Although stannous 4-phenylcatecholate (stannous paraphenylcatecholate) is a preferred stabilizer of this invention, other stannous phenylcatecholates are included as, for example—

Stannous 4-phenyl-6-chlorocatecholate
Stannous 4-phenyl-6-tert-butylcatecholate
Stannous 4(chlorophenyl) catecholate
Stannous 4(bromophenyl) catecholate
Stannous 4-tert-butyl-6-phenylcatecholate
Stannous 4-tert-octyl-6-phenylcatecholate
Stannous 4-chloro-6-phenylcatecholate
Stannous 4-bromo-6-phenylcatecholate
Stannous 4-phenyl-6-tert-amylcatecholate
Stannous 4-phenyl-6-bromocatecholate
Stannous 4-phenyl-6-fluorocatecholate
Stannous 4-phenyl-6-normal-decyl catecholate Thus, ortho- and para- phenylcatecholates with halogen in either ring and an alkyl group containing up to ten carbon atoms in either ring are included as stabilizers of this invention. These stabilizers include stannous salts of ortho- and para- phenylcatecholates substituted in either ring with any alkyl group containing up to twenty or more carbon atoms, and thus include dodecyl, octadecyl, etc., in either ring.

The following illustrates one method of preparing the compounds:

EXAMPLE

Stannous p-phenylcatecholate

Thirty-seven grams of 3,4-dihydroxydiphenyl (p-phenylcatechol) was dissolved in 50 per cent ethyl alcohol, and a solution of 45.2 grams of stannous chloride dihydrate in alcohol was added. To the resulting solution, a solution of 16 grams of sodium hydroxide in 200 ml. of 50 per cent alcohol-water was added slowly during stirring. The precipitate was filtered, and then washed successively with 100 ml. portions of 50 per cent ethyl alcohol, ethyl alcohol, and water. It was air-dried and found to weigh 51 grams. On heating, it decomposed before melting. Analysis: Calculated, Tin=40.0%; Found, Tin=44.9%.

This stabilizer was tested against phenyl-beta-naphthylamine by adding small amounts of each to latex resulting from the copolymerization of 1,3-butadiene and styrene in the proportions to give the copolymer known as GR-S. The latices were coagulated, dried and aged. The products were tested manually to determine whether resinification or other deterioration had set in. The results of the tests are recorded in the following table.

*Table I*

| Stabilizer | After Drying 20 Hours at 75° C. | | After aging 4 days at 90° C. | | After aging 1 day at 120° C. | |
|---|---|---|---|---|---|---|
| | Color | Hand Test | Color | Hand Test | Color | Hand Test |
| 1% stannous p-phenylcatecholate. | Light cream. | No deterioration. | Very light. | No deterioration. | Light brown | Slightly set up. |
| 2% stannous p-phenylcatecholate. | ...do... | ...do... | Very light brown. | ...do... | ...do... | Do. |
| 1% phenyl-veta-naphthylamine. | Brown. | ...do... | Brown. | ...do... | Brown. | Considerably set up. |
| 2% phenyl-beta-naphthylamine. | ...do... | ...do... | ...do... | ...do... | Dark brown. | Do. |

The above data show that the test material discolors less than the commercial stabilizer. It may be classed as non-discoloring. It is superior to the commercial stabilizer from the standpoint of copolymer preservation.

In another test in which coagula containing 2 per cent of each stabilizer were dried and then oven-aged at 90° C., the results were:

*Table II*

| Stabilizer | After Drying 20 hours at 75° C. | | Oven-Aging | |
|---|---|---|---|---|
| | | | 2 Days | 4 Days |
| | Color | Condition | Condition | Condition |
| Stannous p-phenylcatecholate. | Light gray-green | No deterioration | Slightly set up | Slightly set up. |
| Phenyl-beta-naphthylamine | Brown | ___do___ | Considerably set up | Cured. |

The samples of Table I were coagulated with purified aluminum sulfate, and those of Table II were coagulated with commercial aluminum sulfate. Both tests show the test stabilizer discolors less than the commercial stabilizer and also gives improved protection to the copolymer.

The copolymer coagula containing 2 per cent of the respective stabilizers were compounded according to the following formula:

```
                                        Parts by weight
Copolymer containing 2% stabilizer_____ 100.0
Coal tar plasticizer_____   3.0
Pine tar_____   3.0
Stearic acid_____   3.0
Zinc oxide_____   5.0
Accelerator_____    1.2
Channel black_____   50.0
Sulfur_____    2.0
```

The stocks were cured for 40, 60, 80 and 120 minutes at 280° F. Some of the cured stocks were aged 4 days in an oven at 212° F. The physical properties of the stocks were then determined. In Table III, for each property average values for the four cures are presented.

*Table III*

| Stabilizer | 200% Modulus | | Tensile Strength | | Elongation at Break | |
|---|---|---|---|---|---|---|
| | Normal | Aged | Normal | Aged | Normal | Aged |
| stannous p-phenylcatecholate | 455 | 1,465 | 2,785 | 2,840 | 685 | 350 |
| phenyl-beta-naphthylamine | 580 | 1,605 | 2,885 | 2,570 | 585 | 300 |

(Modulus and tensile strength are measured herein in pounds per square inch.)

The stock containing the test material compares favorably with that containing the commercial stabilizer.

Stocks similarly compounded from copolymer containing 2 per cent of the different stabilizers were cured and aged 10 hours in an air bomb at 260° F. under 60 pounds air pressure. The following tests show the results of such aging:

*Table IV*

| Stabilizer | 200% Modulus | | Tensile Strength | | Elongation at Break | |
|---|---|---|---|---|---|---|
| | Normal | Aged | Normal | Aged | Normal | Aged |
| stannous p-phenylcatecholate | 455 | 1,330 | 2,785 | 2,625 | 685 | 380 |
| phenyl-beta-naphthylamine | 580 | 1,540 | 2,885 | 2,630 | 585 | 335 |

The test stock proved about equal to that containing the commercial stabilizer, in tensile and elongation retention, and slightly superior from the standpoint of modulus increase.

In testing the stabilizers in a rubber-like butadiene-1,3-acrylonitrile copolymer (composed of 70 per cent butadiene and 30 per cent acrylonitrile), 2 per cent of each stabilizer was added to latex resulting from the copolymerization. The latex was coagulated. The coagula were dried and aged 4 days at 90° C. The following table records the results:

*Table V*

| Stabilizer | Color after Drying | Color and Condition After Aging | |
|---|---|---|---|
| | | Color | Condition |
| stannous p-phenylcatecholate | White | Tan | Good. |
| phenyl-beta-naphthylamine | Light brown | Brown | Do. |

Thus, the stabilizers of this invention are effective in rubbery copolymers of a conjugated-diene monomer and a vinyl monomer. The conjugated-diene monomers include, for example, 1,3-butadiene, isoprene, 2-cyanobutadiene-1,3, cyclopentadiene, piperylene, dimethylbutadiene-1,3, 2-methylbutadiene-1,3, etc. The vinyl monomers include, for example, aromatic monomers such as, for example, styrene, alpha methylstyrene, nuclearly substituted styrenes, monochlorostyrene, dichlorostyrene, vinylnaphthalene, vinylbiphenyl, vinylcarbazole, etc.; and aliphatic monomers such as, for example, acrylonitrile, methacrylonitrile, alpha-chloracrylonitrile, acrylamide, acrylic-acid alkyl esters in which the alkyl radical contains one to five carbon atoms, alkyl-acrylic ketones in which the alkyl group contains one to five carbon atoms, etc.

The stabilizer may be used with other stabilizer. It may be used in amounts ranging from 0.1 to 10.0 per cent. The invention is defined in the claims.

What I claim is:

1. Rubbery copolymer of a conjugated-diene monomer and a vinyl monomer stabilized with a small amount of stannous p-phenylcatecholate.

2. Uncured rubbery copolymer of 1,3-butadiene and styrene stabilized with a small amount of stannous p-phenylcatecholate.

3. Uncured rubbery copolymer of 1,3-butadiene and acrylonitrile stabilized with a small amount of stannous p-phenylcatecholate.

4. Cured rubbery copolymer of 1,3-butadiene and styrene stabilized with a small amount of stannous p-phenylcatecholate.

5. Cured rubbery copolymer of 1,3-butadiene and acrylonitrile stabilized with a small amount of stannous p-phenylcatecholate.

6. The process of stabilizing a rubbery copolymer of a conjugated-diene monomer and a vinyl monomer which comprises mixing therewith stannous p-phenylcatecholate.

HARRY E. ALBERT.

No references cited.